US012767212B2

(12) United States Patent
Jacques et al.

(10) Patent No.: US 12,767,212 B2
(45) Date of Patent: Oct. 20, 2026

(54) ANTI-ROTATION ASSEMBLY WITH TOLERANCE RING

(71) Applicant: Schaeffler Technologies AG & Co. KG, Herzogenaurach (DE)

(72) Inventors: Timothy Jacques, Troy, OH (US); Alexandre Camilo, Rochester Hills, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 408 days.

(21) Appl. No.: 18/498,447

(22) Filed: Oct. 31, 2023

(65) Prior Publication Data

US 2025/0136172 A1 May 1, 2025

(51) Int. Cl.
*B62D 5/04* (2006.01)
*B62D 1/20* (2006.01)

(52) U.S. Cl.
CPC ............. *B62D 5/0403* (2013.01); *B62D 1/20* (2013.01); *B62D 5/0451* (2013.01)

(58) Field of Classification Search
CPC ...... B62D 5/0403; B62D 1/20; B62D 5/0451; B62D 7/1581; B62D 7/14; F16H 2025/204; F16H 25/24
See application file for complete search history.

(56) References Cited

U.S. PATENT DOCUMENTS 11,054,007 B2 7/2021 Shin et al.
11,338,847 B2 5/2022 Yeom et al.
2002/0108803 A1* 8/2002 Toyofuku ............... B62D 5/043 180/443
2002/0112555 A1* 8/2002 Chikaraishi ............... F16H 1/16 74/425
2011/0076096 A1* 3/2011 Slayne .................. F16C 29/002 403/372
2011/0284313 A1* 11/2011 Jungbecker .......... B62D 7/1581 180/443
2013/0160592 A1* 6/2013 Shibazaki ................ B62D 1/16 74/492
2013/0257562 A1 10/2013 Schmidhammer
2013/0324345 A1 12/2013 Asakura et al.
2014/0045634 A1 2/2014 Hong et al.
(Continued)

FOREIGN PATENT DOCUMENTS

CN 114423668 A * 4/2022 ............. B62D 5/046
CN 118572478 A * 8/2024 ............. H01R 13/46
(Continued)

*Primary Examiner* — John Olszewski
*Assistant Examiner* — Matthew D Lee
(74) *Attorney, Agent, or Firm* — Volpe Koenig

(57) ABSTRACT

A steering assembly for a vehicle including a housing and a shaft assembly supported in the housing. The shaft assembly includes a spindle and an anti-rotation component coupled to the spindle. The anti-rotation component restricts rotation of the spindle while permitting translation of the spindle relative to the housing. The spindle and the anti-rotation component are coupled together with a tolerance ring. The spindle can have a circular cross-sectional profile portion adapted to be received in a circular opening of the anti-rotation component. The tolerance ring can be interposed between the circular cross-sectional profile portion of the spindle and the anti-rotation component.

18 Claims, 17 Drawing Sheets

(56) References Cited

U.S. PATENT DOCUMENTS

| | | | | |
|---|---|---|---|---|
| 2014/0056549 | A1 | 2/2014 | Sandey et al. | |
| 2015/0354624 | A1* | 12/2015 | Speicher | F16D 7/021<br>403/140 |
| 2016/0348765 | A1* | 12/2016 | Ishikawa | F16H 7/08 |
| 2022/0169225 | A1* | 6/2022 | Hong | G01D 5/12 |

FOREIGN PATENT DOCUMENTS

| | | | | | |
|---|---|---|---|---|---|
| CN | 222720830 | U | * | 4/2025 | |
| DE | 102019215289 | A1 | * | 4/2020 | B62D 5/006 |
| JP | 2014240678 | A | * | 12/2014 | |
| KR | 20240174001 | A | * | 12/2024 | B62D 5/0421 |
| KR | 20250153603 | A | * | 10/2025 | H02K 7/106 |

* cited by examiner

ANTI-ROTATION ASSEMBLY WITH TOLERANCE RING

TECHNICAL FIELD

The present disclosure is directed to anti-rotation assemblies, and is more particularly related to an anti-rotation assembly for a steering system.

BACKGROUND

Increasing demand for battery-electric vehicles with an extended range means batteries with ever greater capacity are being installed in vehicle underbodies. This equates to a longer wheelbase as compared to vehicles with an internal combustion engine which, in turn, reduces the overall maneuverability (e.g., larger turning radius) of the vehicle. When maneuvering, rear-axle steering reduces the turning circle and increases maneuverability by steering in the direction opposite to the front wheels. At higher speeds, rear-axle steering further optimizes handling by allowing the rear axle to turn in the same direction as the front axle, thereby improving vehicle stability and ride comfort as well as enhancing vehicle safety. It also improves the active intervention possibilities of automated lane change assist systems.

One type of rear wheel steering system includes two subsystems: the mechanical system with a planetary roller gear (PRG) forming the basis and the power pack, which houses the electronics, electric motor and software.

The main function of the PRG assembly is to convert rotation into linear displacement. The PRG assembly includes a linear drive comprising a spindle, anti-rotation component and an output shaft. The anti-rotation component is used to lock the radial movement between a spindle and a housing of the rear wheel steering system. This allows only linear displacement of the spindle in the linear drive as designed.

Current assemblies rely on a press fit connection between the spindle and anti-rotation component. Typically, the spindle and anti-rotation component are machined to have mating non-circular cross-sectional profiles such as a polygon shape or a hexagon shape. The anti-rotation component is then pressed onto the spindle.

Machining the profiles of the spindle and anti-rotation component is costly. There is also a risk of shaving material on the spindle during the press-in operation due to the high press-fit required in the joint.

SUMMARY

According to one aspect, a steering assembly for a vehicle comprises a housing, and a shaft assembly supported in the housing. The shaft assembly includes a spindle and an anti-rotation component coupled to the spindle. The anti-rotation component restricts rotation of the spindle while permitting translation of the spindle relative to the housing. The spindle and the anti-rotation component are coupled together with a tolerance ring.

The spindle can have a circular cross-sectional profile portion adapted to be received in a circular opening of the anti-rotation component. The tolerance ring can be interposed between the circular cross-sectional profile portion of the spindle and the anti-rotation component. The tolerance ring can include a plurality of axially extending circumferentially spaced-apart protrusions on an outer circumference thereof. An outside diameter of the tolerance ring between diametrically opposed protrusions can be equal to or greater than an inside diameter of the circular opening of the anti-rotation element prior to installation. The circular cross-sectional profile portion of the spindle can have a first diameter, the circular opening of the anti-rotation component can have a second diameter greater that the first diameter such that the first and second diameters define a clearance, and the tolerance ring can have a diameter greater than the clearance prior to installation. The spindle can be part of a planetary roller gear assembly. An output shaft can be coupled to the spindle for translation therewith.

In accordance with another aspect, a shaft assembly for an associated steering system comprises a spindle, and an anti-rotation component coupled to the spindle. The anti-rotation component can have a non-circular cross-sectional outer surface for restricting rotation of the spindle while permitting translation of the spindle when installed in a housing of the associated steering system. The spindle and the anti-rotation component can be coupled together with a tolerance ring.

The spindle can have a circular cross-sectional profile portion adapted to be received in a circular opening of the ant-rotation component. The tolerance ring can be interposed between the circular cross-sectional profile portion of the spindle and the anti-rotation component. The tolerance ring can include a plurality of axially extending circumferentially spaced-apart protrusions on an outer circumference thereof. An outside diameter of the tolerance ring between diametrically opposed protrusions can be equal to or greater than an inside diameter of the circular opening of the anti-rotation element prior to installation. The circular cross-sectional profile portion of the spindle can have a first diameter, the circular opening of the anti-rotation component can have a second diameter greater that the first diameter such that the first and second diameters define a clearance, and the tolerance ring can have a diameter greater than the clearance prior to installation. The spindle can be part of a planetary roller gear assembly. An output shaft can be coupled to the spindle for translation therewith.

In according with another aspect, a method of assembling a shaft assembly comprises positioning a tolerance ring on a circular cross-sectional profile portion of a spindle, and pressing an anti-rotation component having a circular opening over the tolerance ring and the circular cross-sectional profile portion of the spindle to rotationally interlock the spindle and the anti-rotation component.

The method can also include radially compressing at least a portion of the tolerance ring during pressing, and/or coupling the spindle to an output shaft. Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
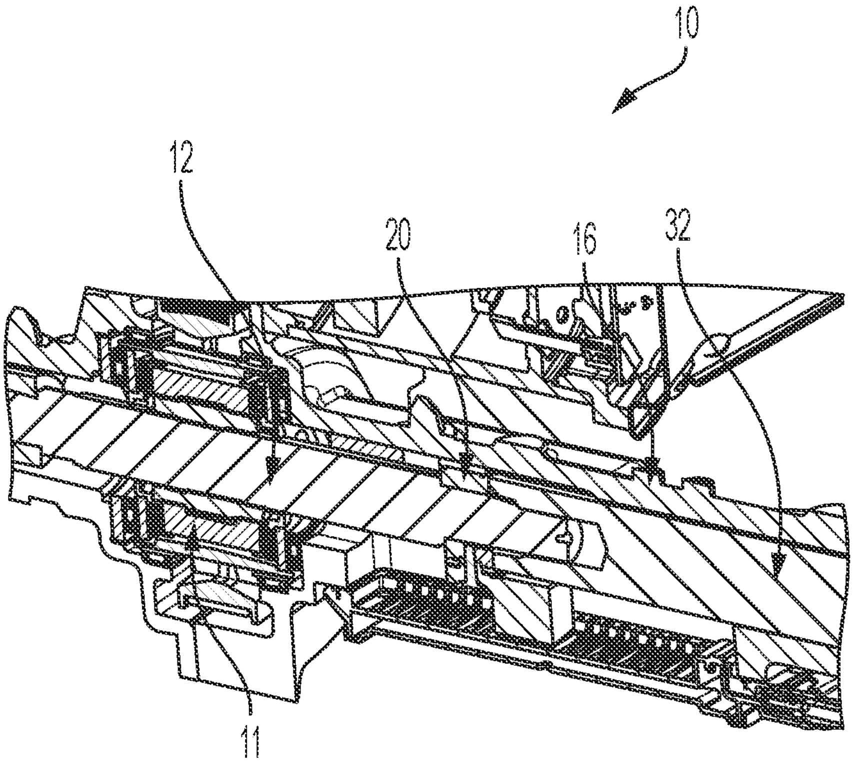
FIG. 1 PRIOR ART
FIG. 1 a perspective cutaway view of a rear wheel steering system having a planetary roller gear assembly and a linear drive according to the prior art.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

In FIG. 1, a portion of a conventional rear wheel steering (RWS) system 10 is illustrated. The RWS system 10 includes PRG assembly 11 having a spindle 12 supported for linear movement in a housing 16 by an anti-rotation component 20.

Figure 2:
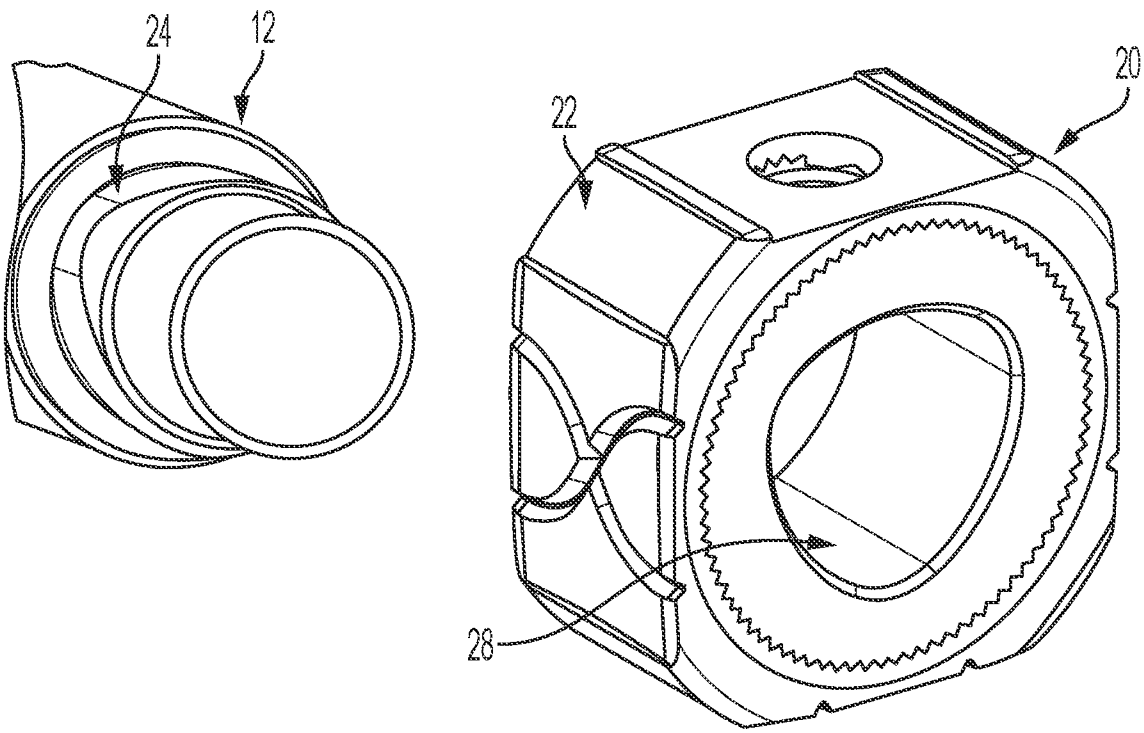
FIG. 2 PRIOR ART
FIG. 2 is a perspective view of a prior art spindle and anti-rotation component prior to assembly.
Figure 3:
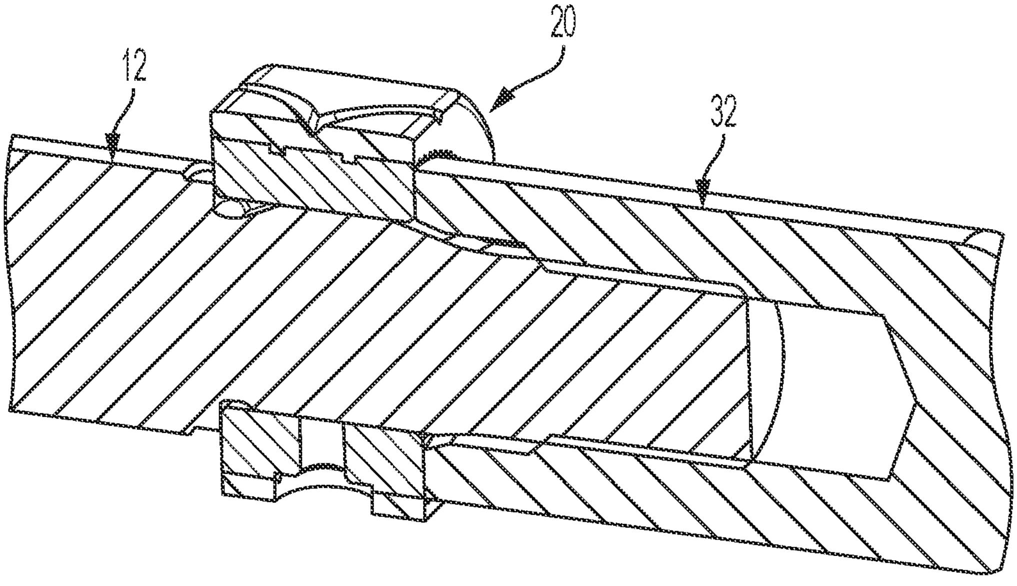
FIG. 3 PRIOR ART
FIG. 3 is a cross-sectional view of a linear drive according to the prior art.

With additional reference to FIGS. 2 and 3, the anti-rotation component 20 includes a non-circular cross-sectional outer surface 22 adapted to engage corresponding surfaces of the housing 16 to restrict rotation. The spindle 12 has a non-circular cross-sectional profile 24 adapted to be received in a correspondingly shaped opening 28 of the anti-rotation component 20. To this end, the spindle 12 and the anti-rotation component 20 typically require machining of the cooperating cross-sectional profiles to tight tolerances. The anti-rotation component 20 is then pressed onto the spindle 12. The spindle 12 is further coupled to an output shaft 32, and the linear drive (e.g., spindle 12, anti-rotation component 20 and output shaft 32) is installed in the housing 16. Accordingly, the spindle 12 and anti-rotation component 20 are fixed against relative rotation such that when the linear drive is supported in the housing 16 the anti-rotation component 20 restricts rotation of the spindle 12 while permitting linear translation of the spindle 12 and the output shaft 32.

Figure 4:
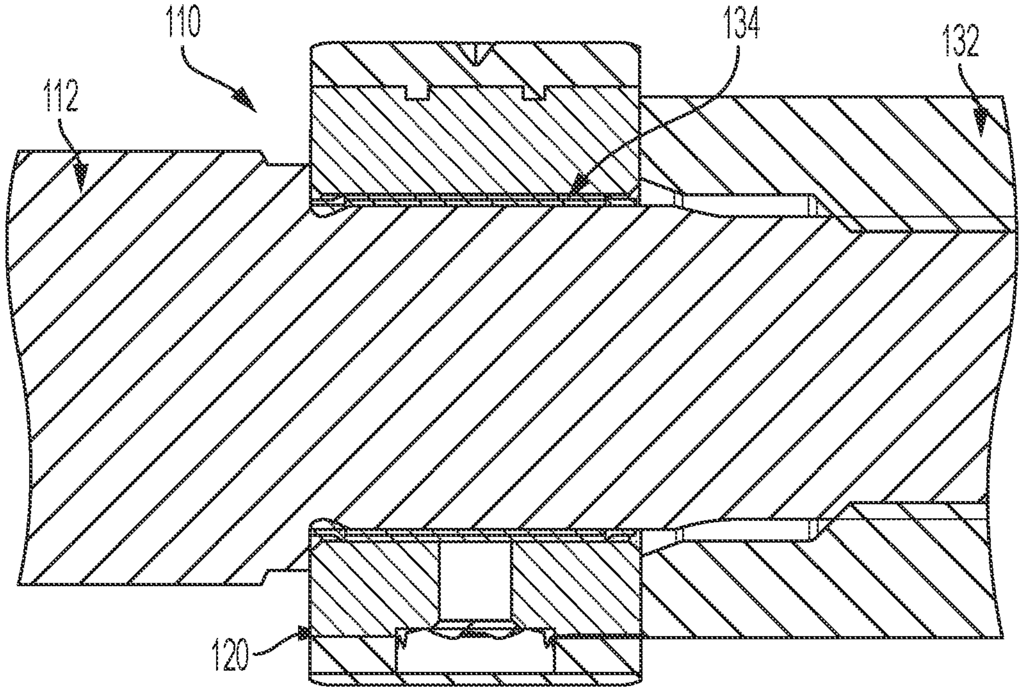
FIG. 4 is a cross-sectional view of an exemplary linear drive including a tolerance ring in accordance with the present disclosure.
Figure 5:
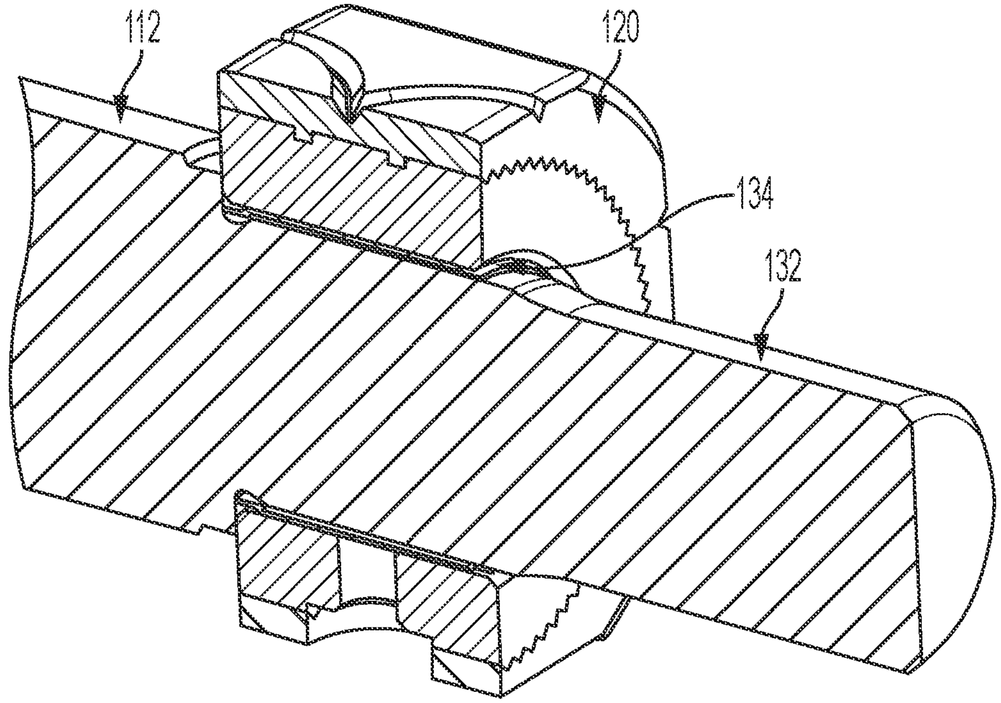
FIG. 5 is a perspective cut-away view of an anti-rotation component, tolerance ring and spindle of the linear drive of FIG. 4 prior to connection with an output shaft.

Turning to FIGS. 4 and 5, and in accordance with the present disclosure, a linear drive is shown and identified generally by reference numeral 110. The linear drive 110 includes a spindle 112, an anti-rotation component 120 and an output shaft 132. In accordance with the present disclosure, a tolerance ring 134 is interposed between the spindle 112 and the anti-rotation component 120. The linear drive 110 is configured to replace the corresponding components of the RWS system 10 shown in FIG. 1 (e.g., the spindle 12, anti-rotation component 20 and output shaft 32). These components can be generically referred to as a shaft assembly.

Figure 6:
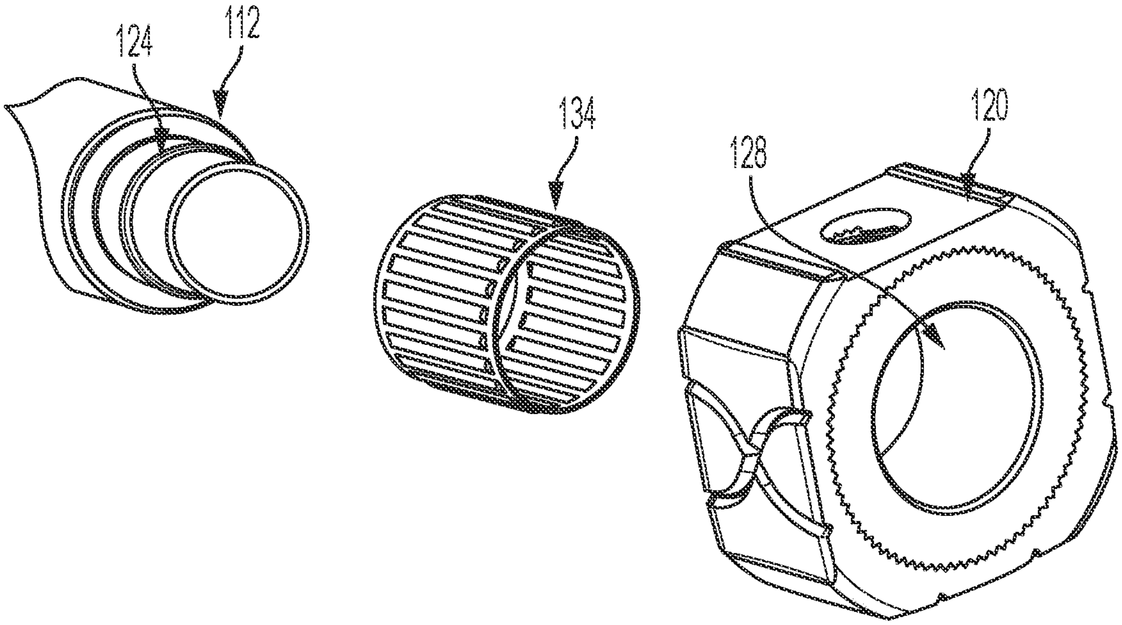
FIG. 6 is an exploded perspective view of a spindle, tolerance ring and anti-rotation component in accordance with the present disclosure.

With additional reference to FIG. 6, the spindle 112 has a circular cross-sectional profile portion 124 adapted to be received in a correspondingly shaped opening 128 of the anti-rotation component 120. The tolerance ring 134 is configured to be received on the circular cross-sectional profile portion 124 of the spindle 112. To this end, the spindle 112 and the anti-rotation component 120 do not require special machining to achieve mating non-circular cross-sectional profiles and/or close tolerances. Instead, a clearance between the outer diameter of the circular cross-sectional profile portion 124 of the spindle 112 and the inner diameter of the anti-rotation component 120 may be desired.

Figure 7:
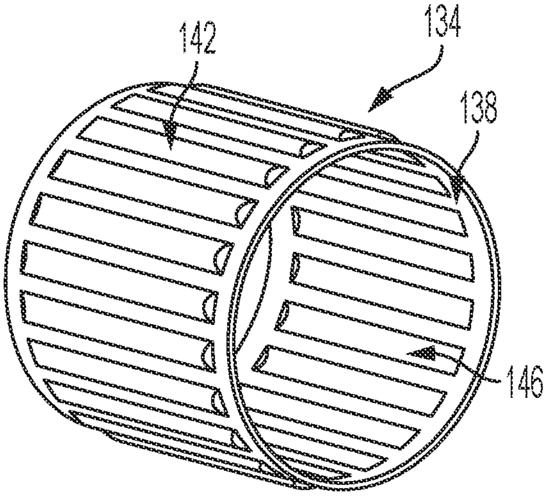
FIG. 7 is a perspective view of an exemplary tolerance ring.
Figure 8:
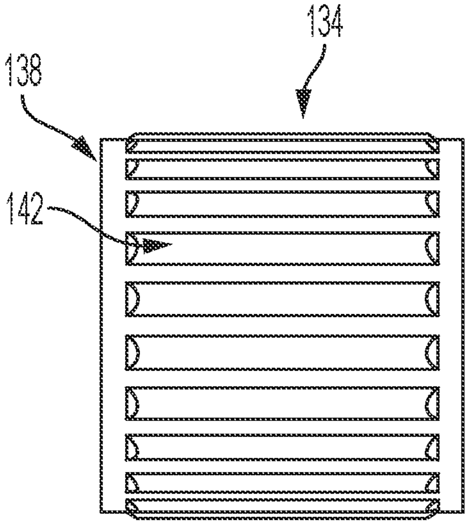
FIG. 8 is a side elevation view of the tolerance ring of FIG. 7.

As seen in FIGS. 7 and 8, the tolerance ring 134 includes a generally cylindrical body 138 having a plurality of axially extending, circumferentially spaced-apart protrusions 142 on its outer diameter and a plurality of axially extending, circumferentially spaced-apart recesses 146 on its inner diameter. In general, a clearance is defined between the outer diameter of the circular cross-sectional profile portion 124 of the spindle 112 and the inside diameter of the opening 128 of the anti-rotation component 120. This clearance is taken up by the tolerance ring 134. In one example, an inside diameter of the tolerance ring 134, measured between two pairs of diametrically opposed recesses 146, is configured to closely match the outside diameter of the circular cross-sectional profile portion 124 of the spindle 112. The outside diameter of the tolerance ring 134, measured across diametrically opposed protrusions 142, is configured to be somewhat larger than the inside diameter of the opening of the anti-rotation component 120.

Figure 9:
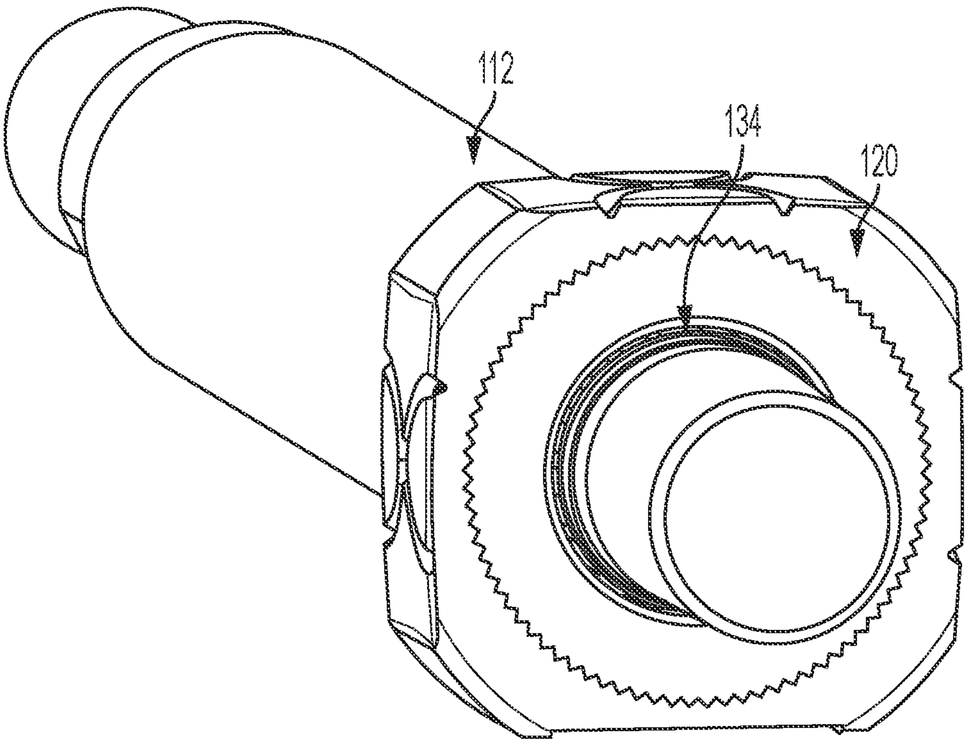
FIG. 9 is a perspective view of the assembled spindle, tolerance ring and anti-rotation component assembly.
Figure 10:
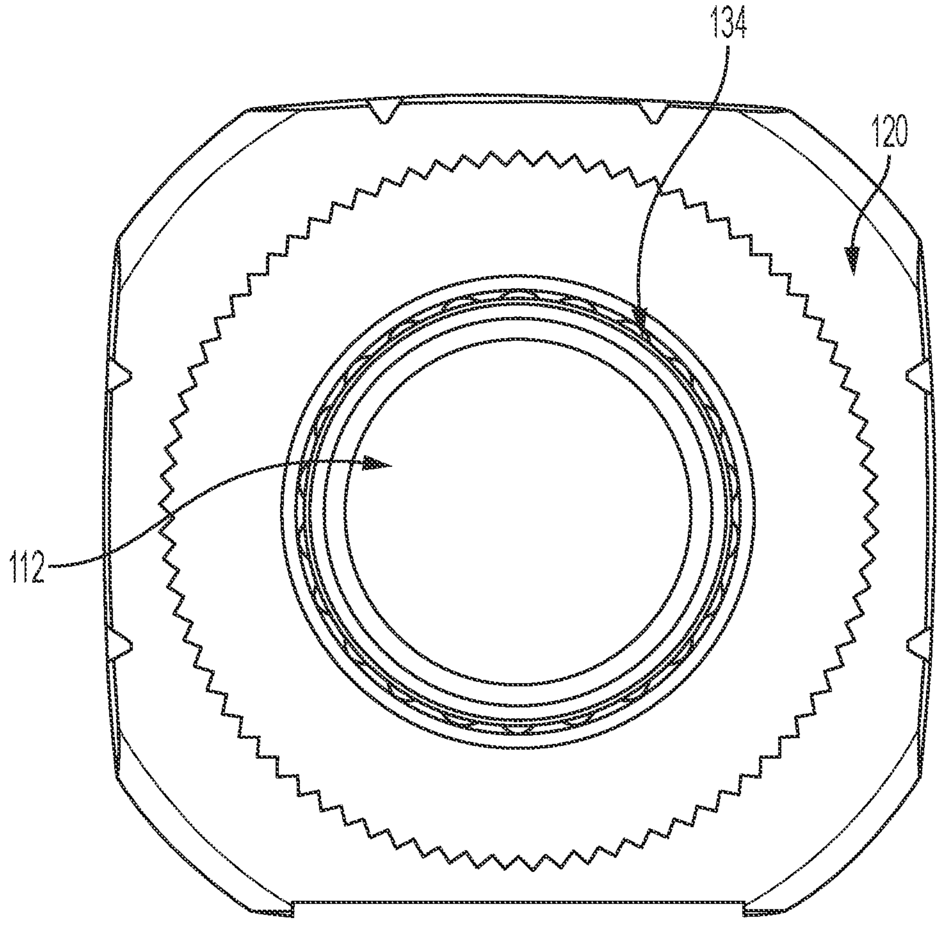
FIG. 10 is an end view of the assembled spindle, tolerance ring and anti-rotation component assembly.
Figure 11:
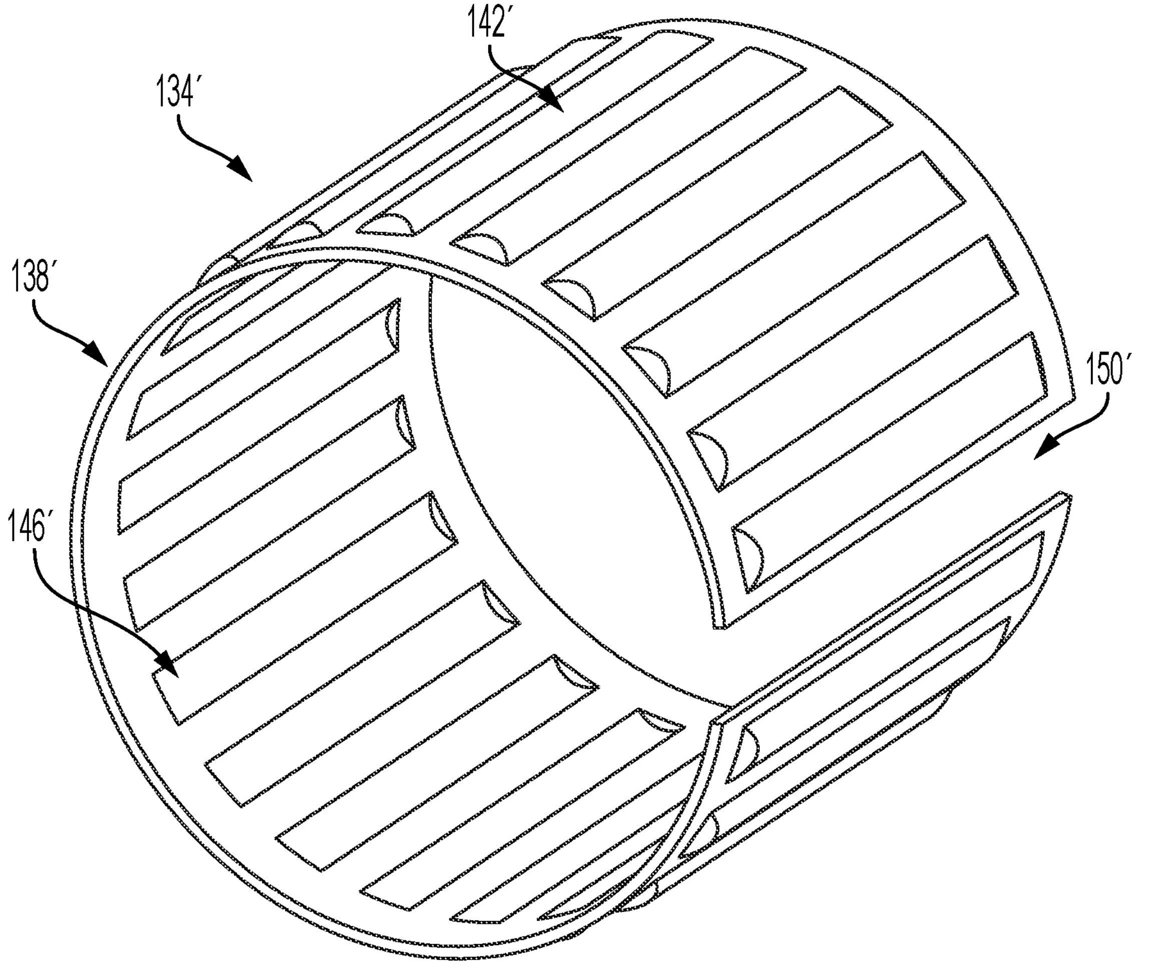
FIG. 11 is a perspective view of another exemplary tolerance ring in accordance with the present disclosure.
Figure 12:
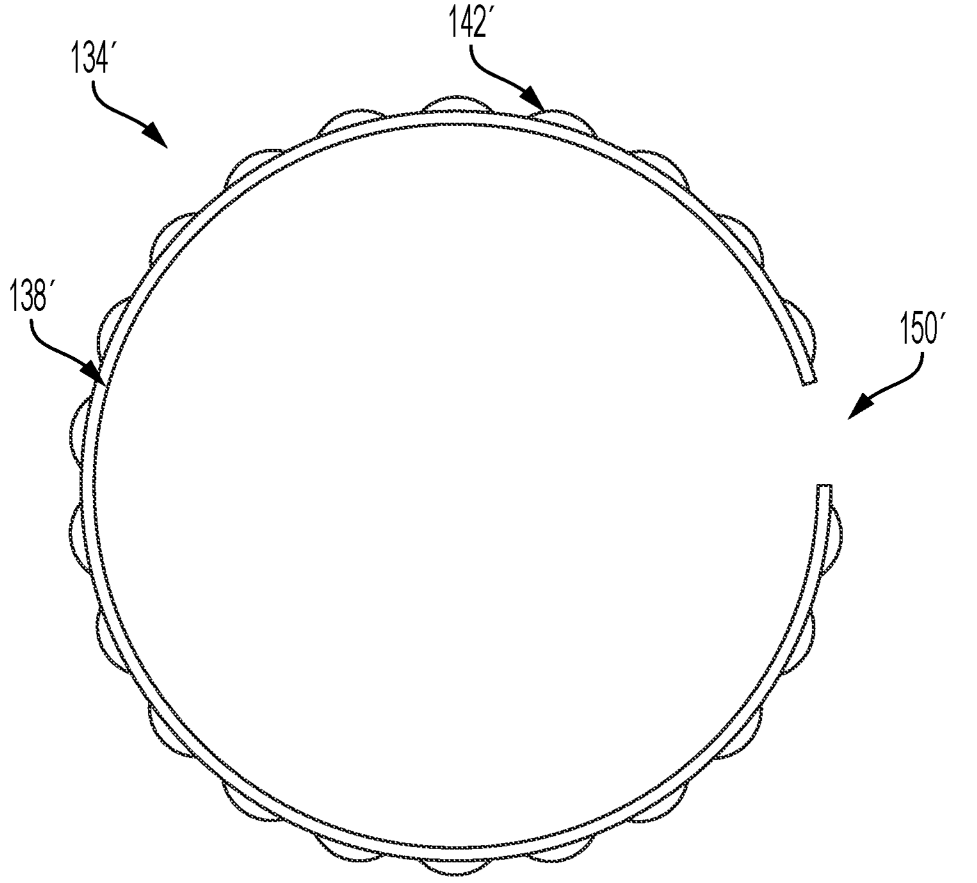
FIG. 12 is an end view of the tolerance ring of FIG. 11.
Figure 13:
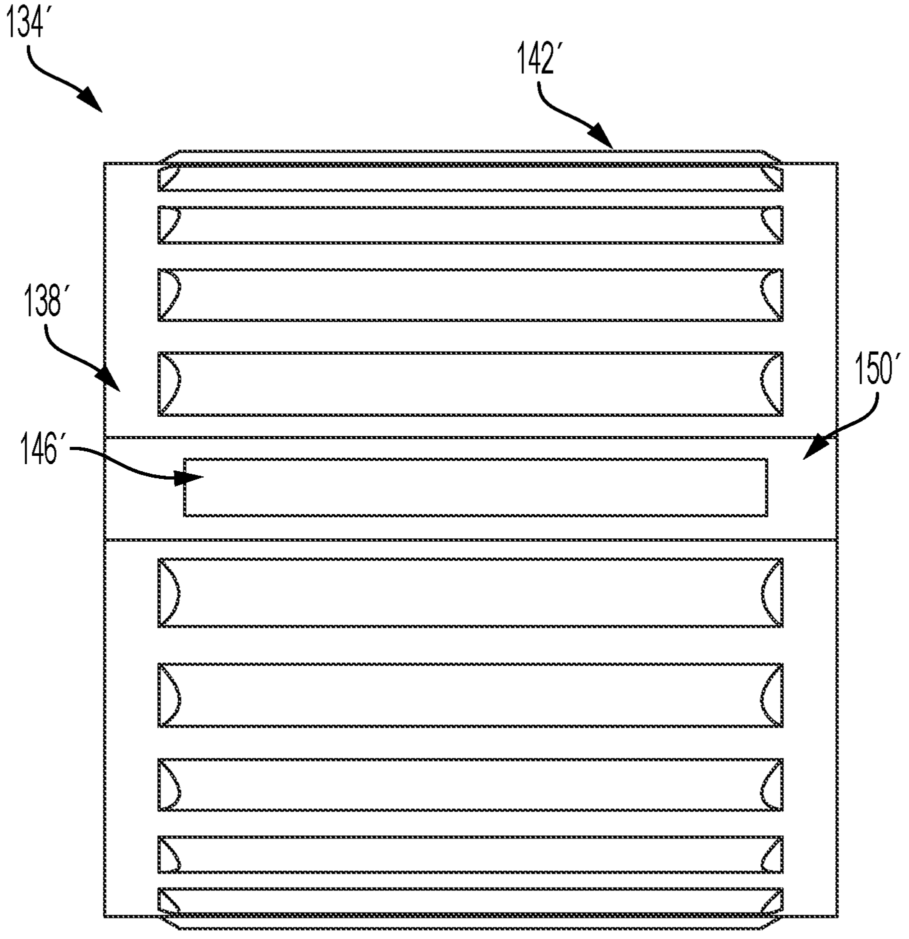
FIG. 13 is a side elevation view of the tolerance ring of FIG. 11.

Turning to FIGS. 9 and 10, upon assembly of the tolerance ring 134 and anti-rotation component 120 to the spindle 112, the protrusions 142 of the tolerance ring 134 are configured to be compressed/deformed in a radially inward direction and frictionally interlock the spindle 112 and the anti-rotation component 120. When assembled, compression/deformation of the protrusions 142 create circumferentially-spaced apart rectangular contact zones. When the protrusions 142 are compressed/deformed, the inner diameter of the tolerance ring compresses/deforms the outside diameter of the tolerance ring such that slippage does not occur. This deformation of the protrusions 142 creates rectangular, circumferentially-spaced apart contact zones between the tolerance ring 134 and the anti-rotation component. In this manner, the tolerance ring 134 provides the press-fit required to counteract the torque of the RWS electric motor and vehicle loads.

Figure 14:
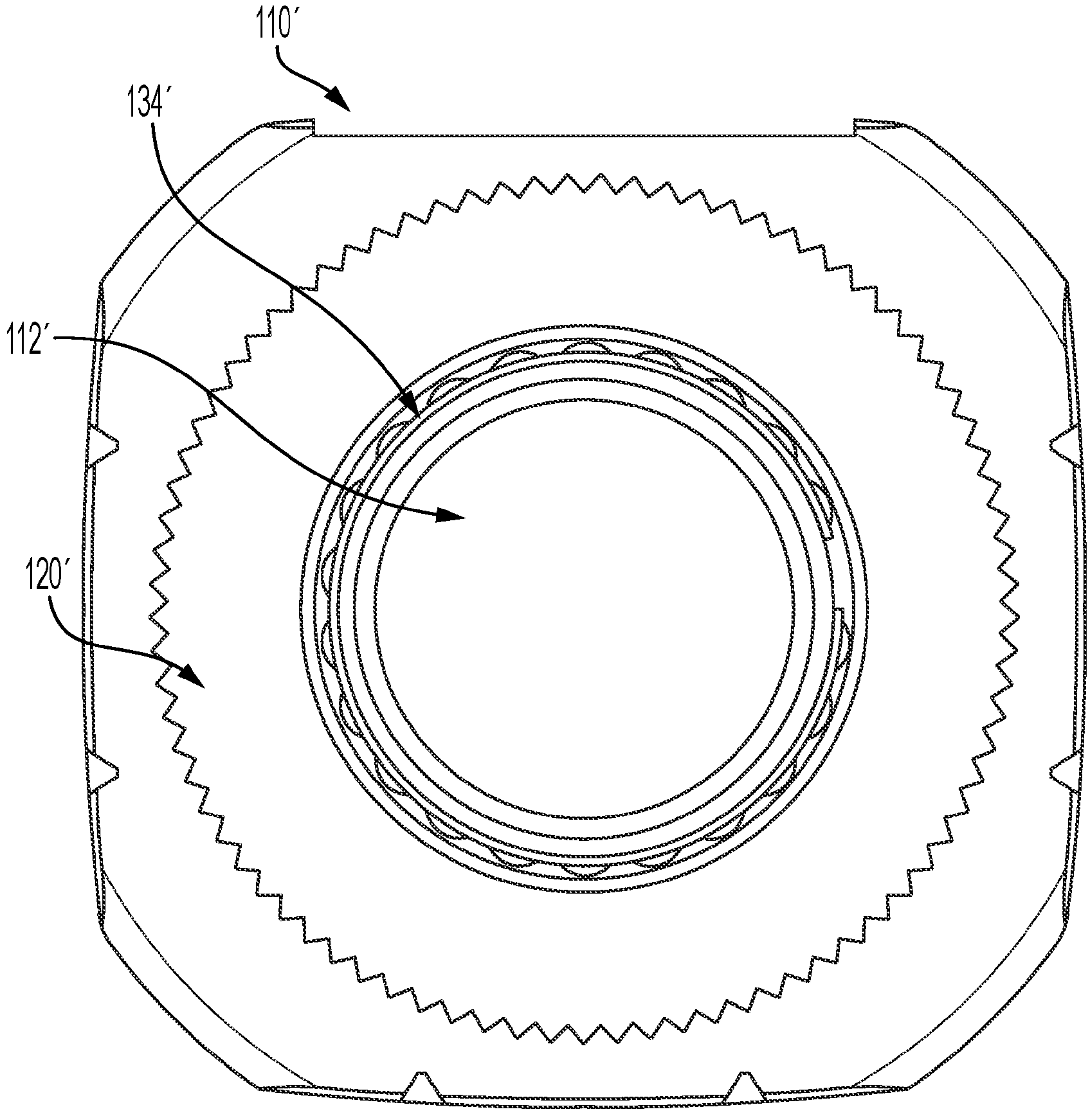
FIG. 14 is an end view of linear drive including the tolerance ring of FIG. 11.
Figure 15:
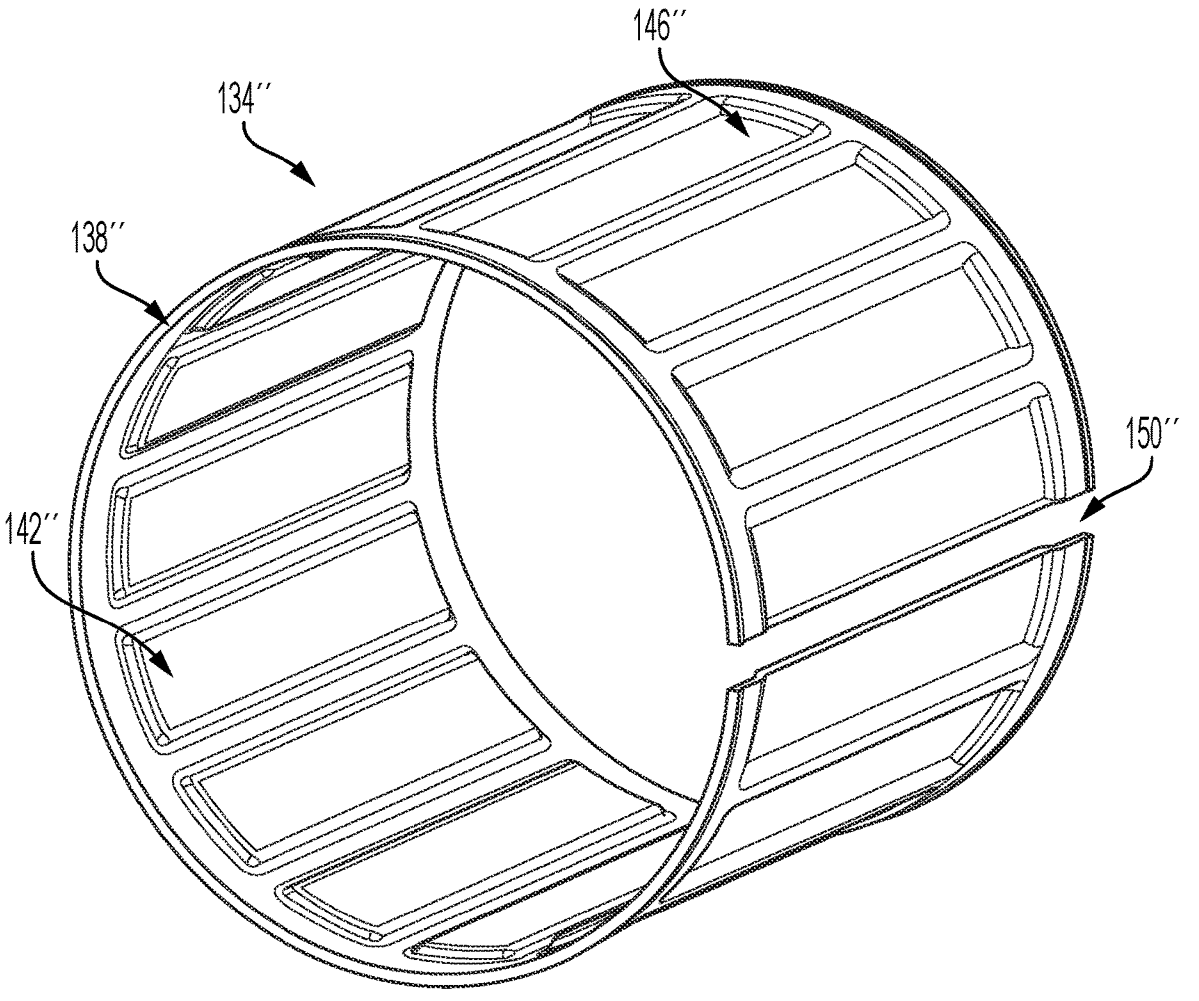
FIG. 15 is a perspective view of another exemplary tolerance ring in accordance with the present disclosure.
Figure 16:
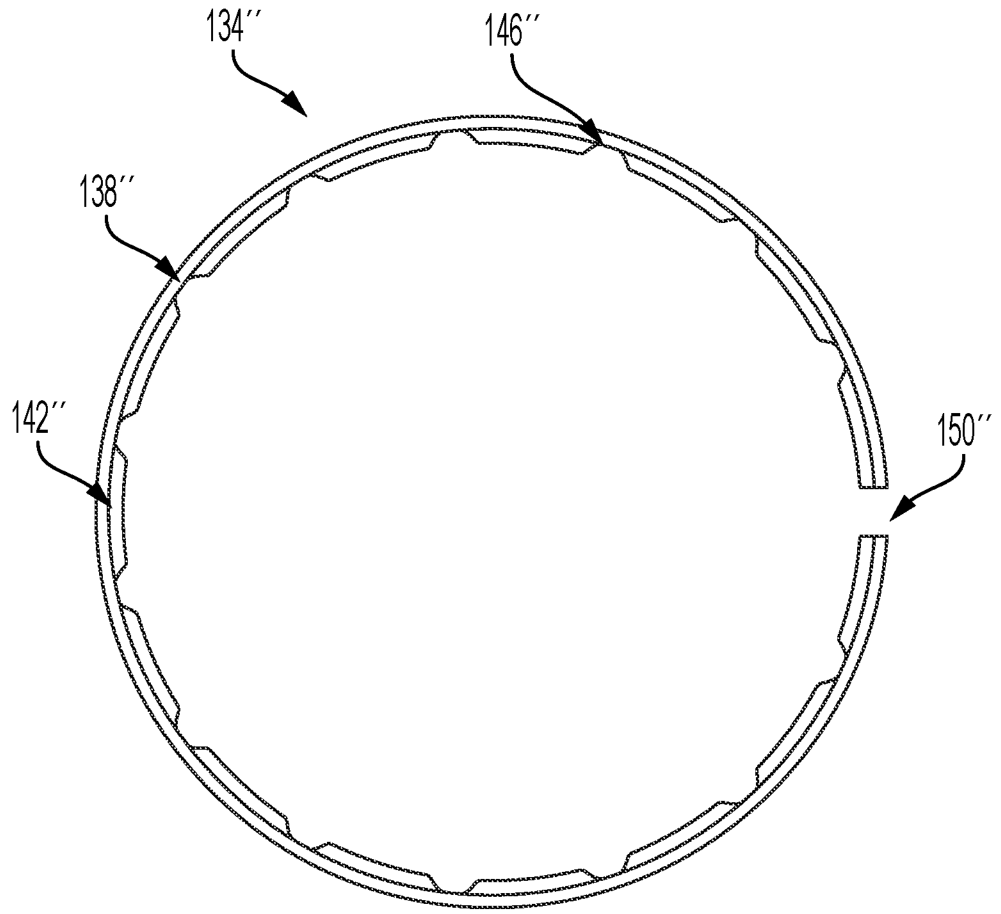
FIG. 16 is an end view of the tolerance ring of FIG. 15.
Figure 17:
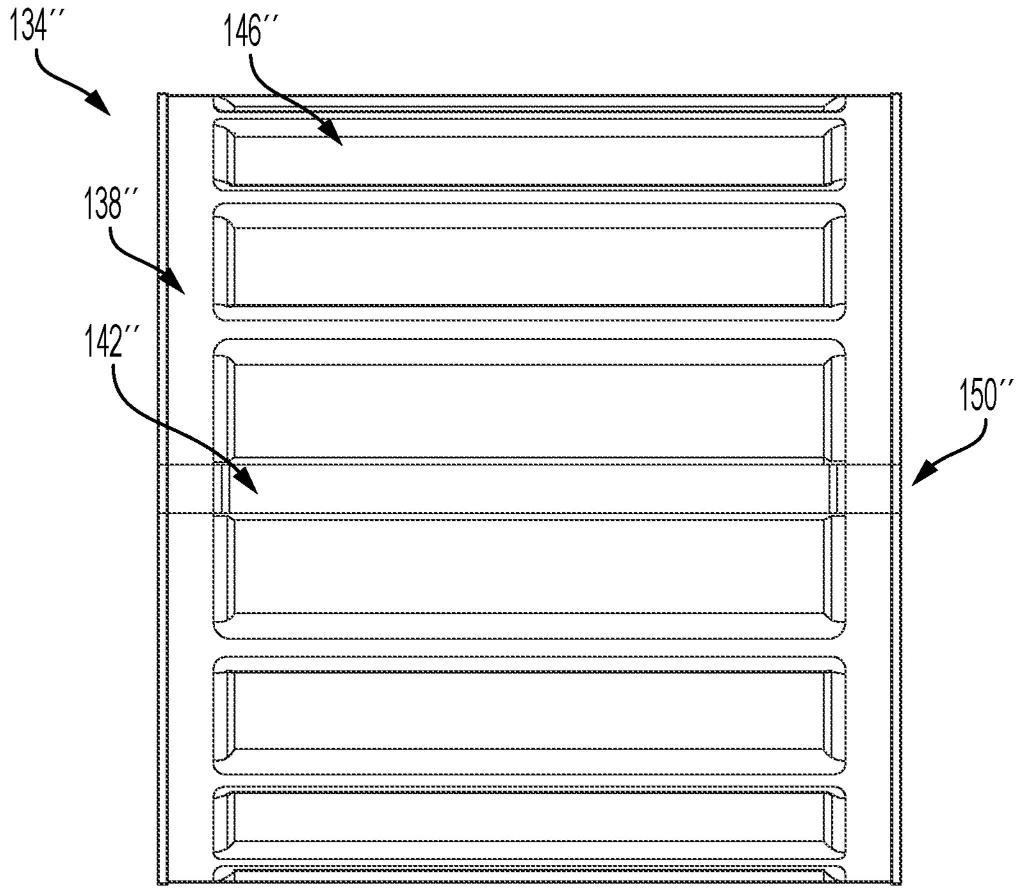
FIG. 17 is a side elevation view of the tolerance ring of FIG. 15.

Alternative tolerance ring configurations are shown in FIGS. 11-14 and 15-18. In FIGS. 11-14, a tolerance ring 134' includes a generally cylindrical body 138' having a plurality of axially extending, circumferentially spaced-apart protrusions 142' on its outer diameter and a plurality of axially extending, circumferentially spaced-apart recesses 146' on its inner diameter. In this example, the tolerance ring 134' is a split tolerance ring. In this regard, the cylindrical body 138' is circumferentially discontinuous at gap 150'. The tolerance ring 134' may be useful in a wider range of applications than a continuous split ring (e.g., split ring 134) as it can be more readily installed on a range of shaft diameters and/or can be installed to a shaft from a radial direction by spreading the gap 150' sufficiently to receive the shaft in a radial direction. FIG. 14 illustrates the tolerance ring 134' interposed between a spindle 112' and an anti-rotation component 120' of a linear drive 110'.

Figure 18:
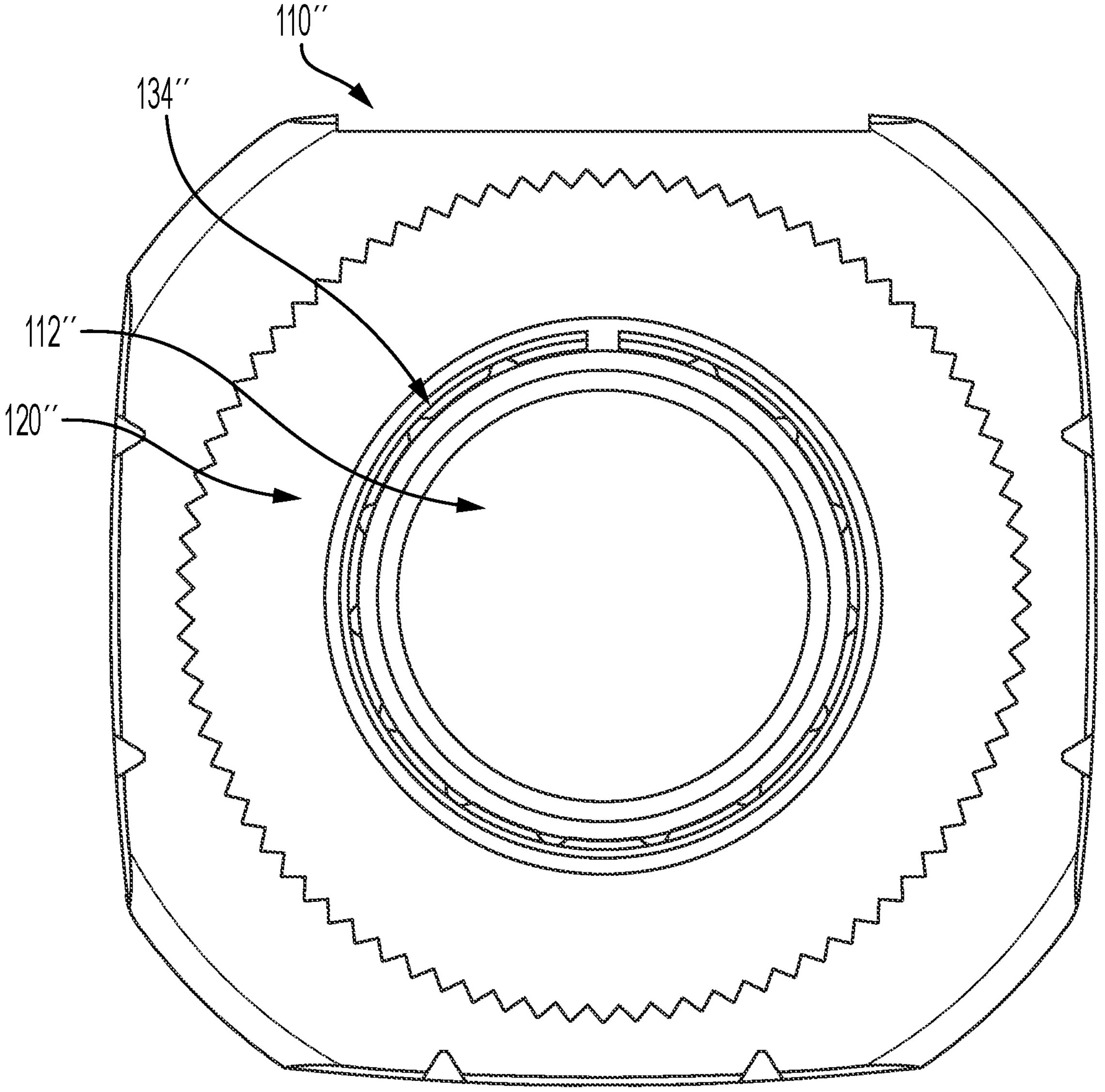
FIG. 18 is an end view of linear drive including the tolerance ring of FIG. 15.

In FIGS. 15-18, a tolerance ring 134" includes a generally cylindrical body 138" having a plurality of axially extending, circumferentially spaced-apart protrusions 142" on its inner diameter and a plurality of axially extending, circumferentially spaced-apart recesses 146" on its outer diameter. In this example, the tolerance ring 134' is also a split tolerance ring. In this regard, the cylindrical body 138" is circumferentially discontinuous at gap 150". FIG. 18 illustrates the tolerance ring 134" interposed between a spindle 112" and an anti-rotation component 120" of a linear drive 110".

Aspects of the present disclosure result in improved durability since the stress area is shifted to a larger area as compared to prior assemblies. In addition, deflection of the components has been shown to be reduced.

It should be appreciated that aspects of the present disclosure are applicable to other types of assemblies where rotationally interlocking concentric components is desired. For example, other types of linear actuators in addition to planetary roller gear assemblies.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

10 RWS
11 PRG
12 spindle
16 housing
20 anti-rotation component
22 non-circular cross-sectional outer surface
24 non-circular cross-sectional portion
28 opening
32 output shaft
110, 110', 110" linear drive
112, 112', 112" spindle
120, 120', 120" anti-rotation component
124 circular cross-sectional portion
128 opening
132 output shaft
134, 134', 134" tolerance ring
138, 138', 138" cylindrical body
142, 142', 142" protrusions
146, 146', 146" recesses
150', 150" gap

What is claimed is:

1. A steering assembly for a vehicle comprising:
a housing; and
a shaft assembly supported in the housing, the shaft assembly including a spindle and an anti-rotation component coupled to the spindle, the anti-rotation component having a non-circular cross-sectional outer surface for restricting rotation of the spindle while permitting translation of the spindle relative to the housing;
wherein the spindle and the anti-rotation component are coupled together with a tolerance ring.

2. The steering assembly according to claim 1, wherein the spindle has a circular cross-sectional profile portion adapted to be received in a circular opening of the anti-rotation component.

3. The steering assembly according to claim 2, wherein the tolerance ring is interposed between the circular cross-sectional profile portion of the spindle and the anti-rotation component.

4. The steering assembly according to claim 3, wherein the tolerance ring includes a plurality of axially extending circumferentially spaced-apart protrusions on an outer circumference thereof.

5. The steering assembly according to claim 4, wherein an outside diameter of the tolerance ring between diametrically opposed protrusions is equal to or greater than an inside diameter of the circular opening of the anti-rotation element prior to installation.

6. The steering assembly according to claim 4, wherein the circular cross-sectional profile portion of the spindle has a first diameter, the circular opening of the anti- rotation component has a second diameter greater that the first diameter such that the first and second diameters define a clearance, and wherein the tolerance ring has a radial thickness greater than the clearance prior to installation.

7. The steering assembly according to claim 1, wherein the spindle is part of a planetary roller gear assembly.

8. The steering assembly according to claim 1, further comprising an output shaft coupled to the spindle for translation therewith.

9. A shaft assembly for an associated steering system comprising:
a spindle; and
an anti-rotation component coupled to the spindle, the anti-rotation component having a non-circular cross-sectional outer surface for restricting rotation of the spindle while permitting translation of the spindle when installed in a housing of the associated steering system;
wherein the spindle and the anti-rotation component are coupled together with a tolerance ring.

10. The shaft assembly according to claim 9, wherein the spindle has a circular cross-sectional profile portion adapted to be received in a circular opening of the ant-rotation component.

11. The shaft assembly according to claim 10, wherein the tolerance ring is interposed between the circular cross-sectional profile portion of the spindle and the anti-rotation component.

12. The shaft assembly according to claim 11, wherein the tolerance ring includes a plurality of axially extending circumferentially spaced-apart protrusions on an outer circumference thereof.

13. The shaft assembly according to claim 12, wherein an outside diameter of the tolerance ring between diametrically opposed protrusions is equal to or greater than an inside diameter of the circular opening of the anti-rotation element prior to installation.

14. The shaft assembly according to claim 12, wherein the circular cross-sectional profile portion of the spindle has a first diameter, the circular opening of the anti-rotation component has a second diameter greater that the first diameter such that the first and second diameters define a clearance, and wherein the tolerance ring has a diameter greater than the clearance prior to installation.

15. The shaft assembly according to claim 9, wherein the spindle is part of a planetary roller gear assembly.

16. The shaft assembly according to claim 9, further comprising an output shaft coupled to the spindle for translation therewith.

17. A method of assembling a shaft assembly comprising:

positioning a tolerance ring on a circular cross-sectional profile portion of a spindle;

and pressing an anti-rotation component having a circular opening over the tolerance ring and the circular cross-sectional profile portion of the spindle;

wherein, during the pressing, at least a portion of the tolerance ring is radially compressed;

whereby the spindle and the anti-rotation component are fixed together for rotation.

18. The method of claim 17, further comprising coupling the spindle to an output shaft.

* * * * *